US008419404B2

(12) United States Patent
Ho et al.

(10) Patent No.: US 8,419,404 B2
(45) Date of Patent: Apr. 16, 2013

(54) MODULAR MOLDING ASSEMBLY FOR ELECTRONIC DEVICES

(75) Inventors: Shu Chuen Ho, Singapore (SG); Jian Wu, Singapore (SG); Choon Hong Cheong, Singapore (MY); Chee Toh Teh, Singapore (MY); Fu Sun Huang, Singapore (SG)

(73) Assignee: ASM Technology Singapore Pte Ltd, Singapore (SG)

( * ) Notice: Subject to any disclaimer, the term of this patent is extended or adjusted under 35 U.S.C. 154(b) by 702 days.

(21) Appl. No.: 12/701,036

(22) Filed: Feb. 5, 2010

(65) Prior Publication Data

US 2011/0195140 A1 Aug. 11, 2011

(51) Int. Cl.
*B29C 45/02* (2006.01)
*B29C 45/18* (2006.01)

(52) U.S. Cl.
USPC ..... 425/126.1; 425/116; 425/185; 425/192 R; 425/472

(58) Field of Classification Search ........ 425/116, 425/126.1, 185, 192 R, 227, 472
See application file for complete search history.

(56) References Cited

U.S. PATENT DOCUMENTS 4,480,975 A * 11/1984 Plummer et al. ............ 425/116
4,877,387 A * 10/1989 Fierkens et al. ............ 425/116
5,484,274 A * 1/1996 Neu ............................ 425/116

* cited by examiner

*Primary Examiner* — James Mackey
(74) *Attorney, Agent, or Firm* — Ostrolenk Faber LLP

(57) ABSTRACT

A modular molding assembly comprises an input module for loading electronic devices for molding, a press station including one or more molding presses for molding the electronic devices, an output module for offloading molded electronic devices after they have been molded and a carrier that is movable at least between the input module and the press station and/or the press station and the output module. The carrier has an adaptor located thereon for detachably mounting a first attachment or a second attachment which is operative to perform a function of transporting the electronic devices and/or introducing a molding compound to the press station for conducting molding. The first and second attachments each has a corresponding mounting device for detachably mounting the first or second attachment onto the adapter and the first attachment has a different function from the second attachment.

18 Claims, 9 Drawing Sheets

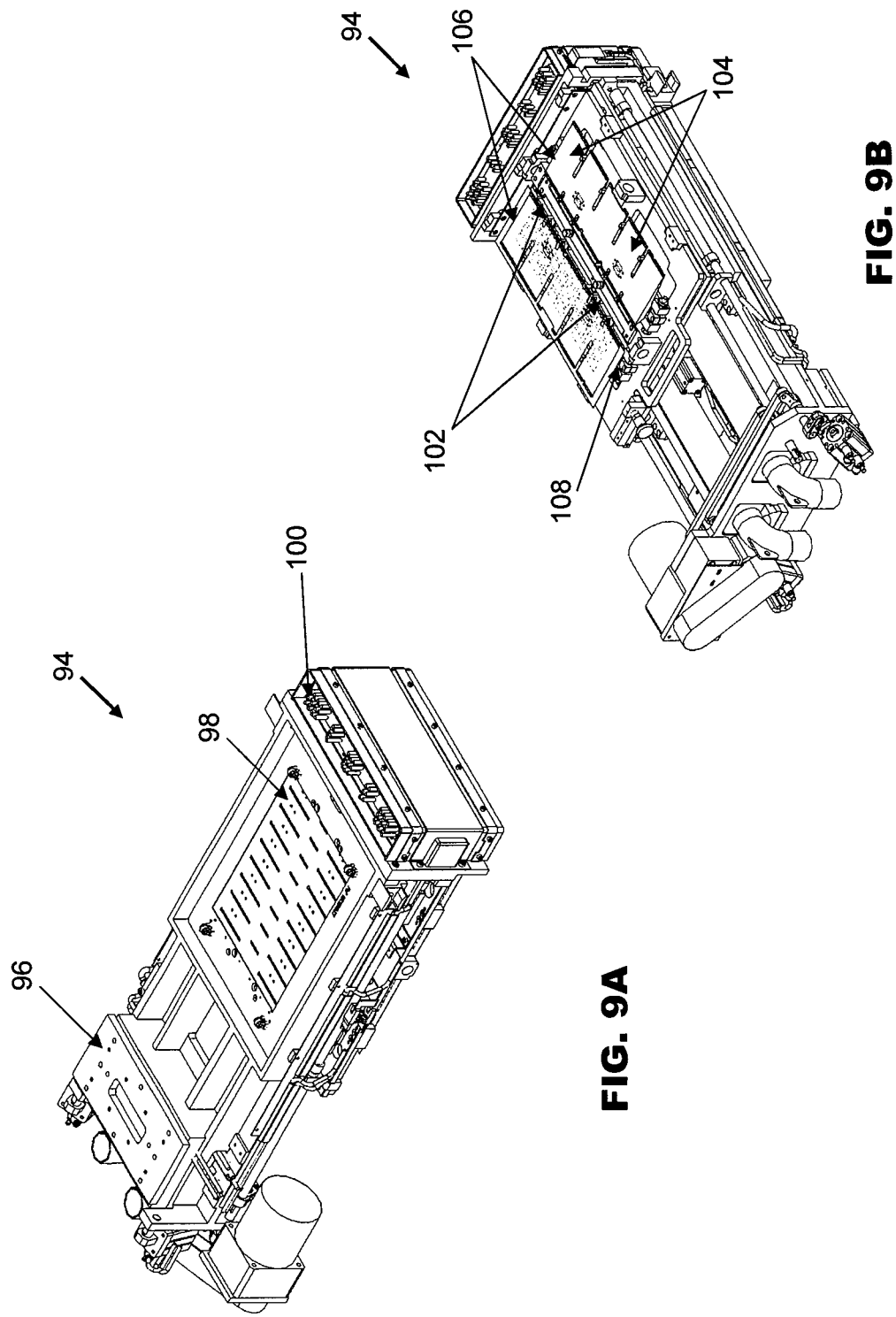

MODULAR MOLDING ASSEMBLY FOR ELECTRONIC DEVICES

FIELD OF THE INVENTION

The invention relates to the molding of electronic devices for sealing electronic components attached to the electronic devices.

BACKGROUND AND PRIOR ART

Conventionally, encapsulating electronic devices encompass either transfer molding or compression molding. In transfer molding, molding compound is introduced as a solid pellet into a mold supply pot of a molding system and melted with the application of heat and pressure to a liquid state. The liquefied molding compound is then forced by a plunger into runners connected between the plunger and molding cavities to enter into molding cavities via narrow gates.

In compression molding, molding compound in the form of powder or liquid or paste resin is typically supplied individually with respect to each electronic device which is to be encapsulated and then a narrow gap between the device and the molding cavity is completely filled up. A spring-biased clamper may then be projected downwardly from a resin molding face to allow the molding machine to apply a compacting force in a molding cavity after a mold is closed onto the electronic device. Machine parts requirements for transfer molding and compression molding processes are different since the two processes are not the same. Typically, a separate machine assembly is necessary for either liquid or powder compression molding on the one hand, and transfer molding on the other. It would therefore be desirable to provide versatile equipment that may be commonly used for both methods of molding employing different types of molding material for efficiency and cost effectiveness.

SUMMARY OF THE INVENTION

It is thus an object of the invention to seek to provide a molding assembly with quick and easy means of switching between working as a transfer molding system and a compression molding system for efficiently and conveniently molding electronic devices at lower cost.

According to a first aspect of the invention, there is provided a modular molding assembly comprising: an input module for loading electronic devices for molding; a press station including one or more molding presses for molding the electronic devices; an output module for offloading molded electronic devices after they have been molded; and a carrier that is movable at least between the input module and the press station and/or the press station and the output module, the carrier having an adaptor located thereon for detachably mounting a first attachment or a second attachment which is operative to perform a function of transporting the electronic devices and/or introducing a molding compound to the press station for conducting molding; wherein the first and second attachments each has a corresponding mounting device for detachably mounting the first or second attachment onto the adapter and the first attachment has a different function from the second attachment.

According to a second aspect of the invention, there is provided a carrier for a modular molding assembly, the modular molding assembly comprising: an input module for loading electronic devices for molding; a press station including one or more molding presses for molding the electronic devices; and an output module for offloading molded electronic devices after they have been molded; wherein the carrier is movable at least between the input module and the press station and/or the press station and the output module and has an adaptor located on the carrier for detachably mounting a first attachment or a second attachment which is operative to perform a function of transporting the electronic devices and/or introducing a molding compound to the press station for conducting molding; wherein the first and second attachments each has a corresponding mounting device for detachably mounting the first or second attachment onto the adapter and the first attachment has a different function from the second attachment.

It will be convenient to hereinafter describe the invention in greater detail by reference to the accompanying drawings, which illustrate the preferred embodiments of the invention. The particularity of the drawings and the related description is not to be understood as superseding the generality of the broad identification of the invention as defined by the claims.

BRIEF DESCRIPTION OF THE DRAWINGS

Examples of the preferred embodiment of a molding assembly in accordance with the invention will now be described with reference to the accompanying drawings, in which:

FIGS. 9A and 9B are isometric top and bottom views respectively of a transfer molding off-loader for use with a transfer molding process for off-loading leadframes and cleaning a mold.

DETAILED DESCRIPTION OF THE PREFERRED EMBODIMENT OF THE INVENTION

Figure 1:
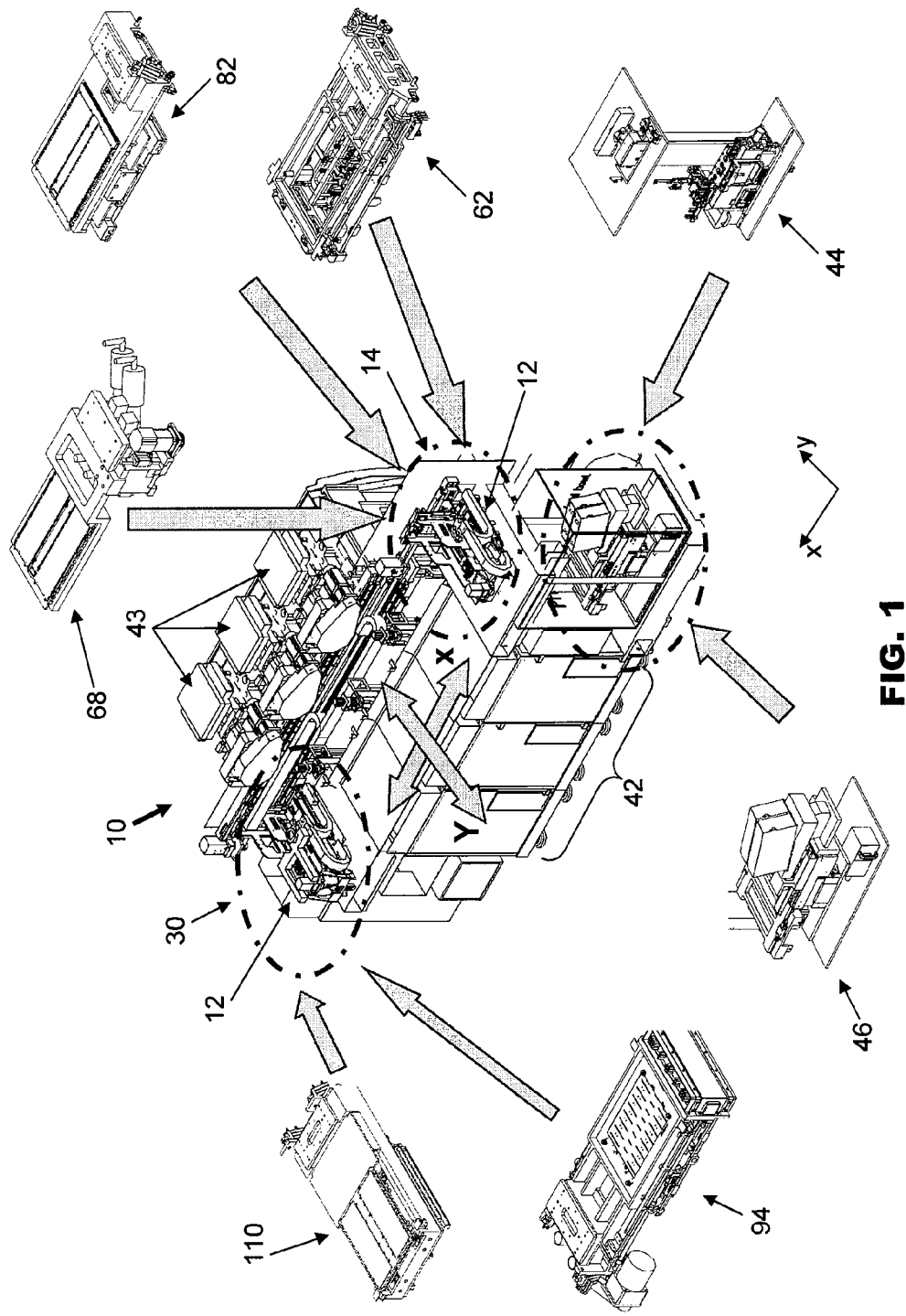
FIG. 1 is an isometric view of a molding assembly incorporating common carriers according to the preferred embodiment of the invention.

FIG. 1 is an isometric view of a molding assembly 10 incorporating a pair of common carriers 12 according to the preferred embodiment of the invention. The molding assembly 10 has a combination of an input module 14, an output module 30 and a press station 42. Various attachments with different functions may be mounted onto the input and output modules 14, 30. The input and output modules 14, 30 are located at opposite ends of a molding assembly line comprising the molding assembly 10, and the press station 42 is located between the input and output modules 14, 30 along the molding assembly line.

Electronic components are loaded to the input module 14 for molding and the molded electronic components are off-loaded from the molding assembly 10 at the output module 30. The press station 42 may comprise a plurality of presses 43 for molding the electronic components, such as three presses 43 illustrated therein which are located adjacent to one another. Each press 43 comprises a conventional press with top and bottom mold halves which may use release film for film assisted molding during transfer or compression molding of electronic devices.

A first common carrier 12 is shown positioned at the input module 14 and is movable between the input module 14 and the press station 42. A second common carrier 12 is shown positioned at the output module 30 and is movable between the press station 42 and the output module 30. An adaptor is located on each common carrier 12 to which an attachment is detachably mounted on the common carrier 12.

The attachments may have different functions, such as transporting electronic devices and/or introducing a molding compound to the press station 43 for conducting molding. For example, the attachments may comprise a substrate and molding compound onloader such as a leadframe and pellet onloader 62 for use with the transfer molding process for transporting leadframes and supplying molding pellets to the press station 42, a liquid dispensing onloader 68 for use with the strip compression molding process for supplying or dispensing molding liquid and/or a powder dispensing onloader 82 for supplying or loading molding resin in powder form to the one or more molding presses 43 during the strip compression molding process. The attachments may also comprise a molding off-loader such as a transfer molding off-loader 94 for use in a transfer molding process for off-loading molded substrates such as leadframes and cleaning the mold, or a compression molding on/off-loader 110 for use with the strip compression molding process for loading unmolded substrates such as leadframes to the press station 42 and off-loading or unloading molded substrates from the presses 43.

Additionally, a feeder bowl and a pellet handler module 44 or a powder dispensing module 46 may be selectively mounted to the input module 14. The feeder bowl and the pellet handler module 44 provide the input module 14 with pellets of molding compound during the transfer molding process while the powder dispensing module 46 provides molding compound for compression molding.

After an attachment has been mounted to the first common carrier 12, the common carrier 12 may be operative to transport the attachment along an X axis in reciprocating directions in-between the input module 14 and the output module 30. At the press station 42, the first common carrier 12 transports a leadframe which is carried by the attachment to one of the presses 43 for molding. Thereafter, molded leadframes may be transferred by an attachment mounted on the second common carrier 12 to the output module 30 for cull removal in the case of transfer molding, before the molded leadframes are transferred to a magazine holder to store and transport the molded leadframes.

Figure 2:
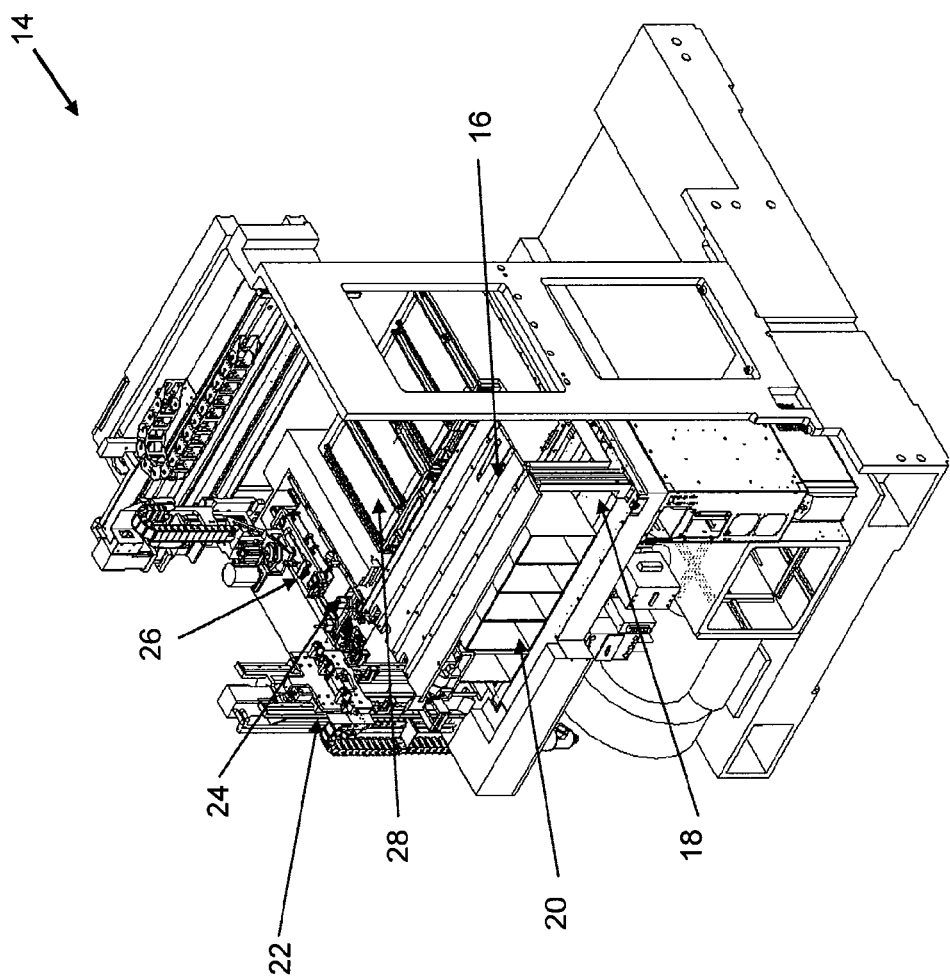
FIG. 2 is an isometric view of an input module of the molding assembly of FIG. 1.

FIG. 2 is an isometric view of the input module 14 of a molding assembly 10 of FIG. 1. The input module 14 is a common framework for use with both transfer and compression molding of electronic devices held on leadframe strips. A top magazine platform 16 holding magazines 20 filled with unmolded leadframes is located above a bottom magazine platform 18 where empty magazines 20 are placed. An elevator picks up a magazine 20 from the top magazine platform 16 and places it on an input magazine platform 22 which is at a level to enable the leadframes to be pushed onto an input track 24. An input transfer arm 26 picks up each leadframe from the input track 24 and transfers the leadframe to a preheating station 28. The elevator then unloads the magazine 20 from which all the unmolded leadframes have been unloaded to the bottom magazine platform 18 for later removal.

Figure 3:
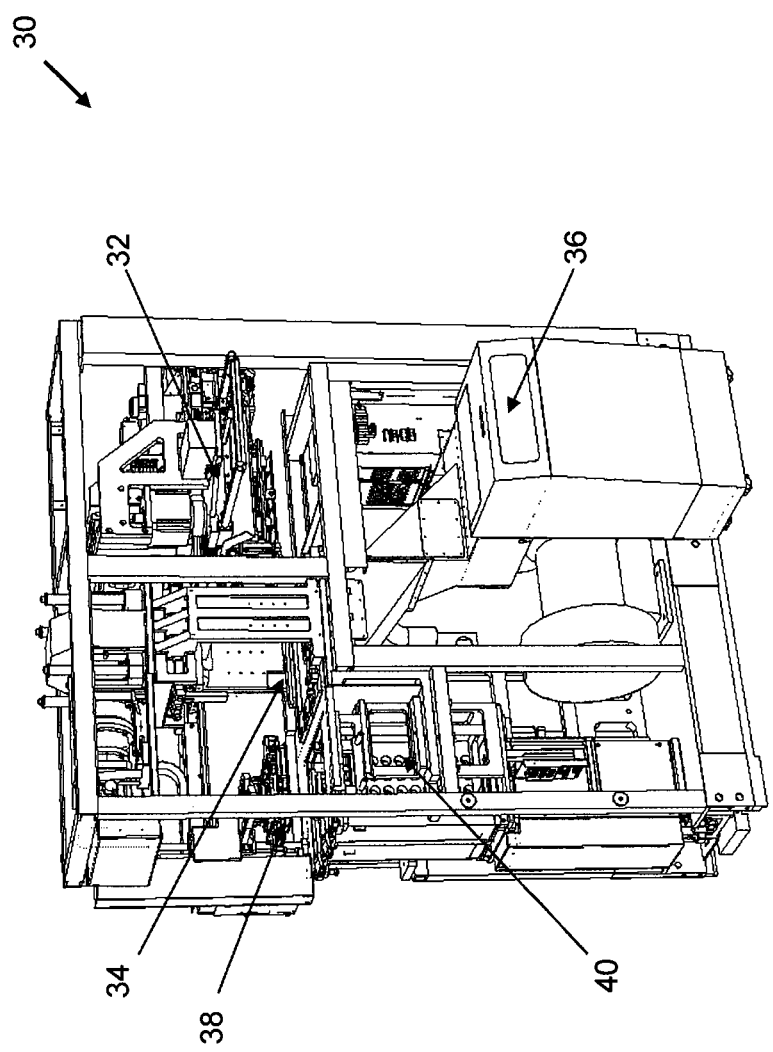
FIG. 3 is an isometric view of an output module of the molding assembly of FIG. 1.

FIG. 3 is an isometric view of the output module 30 of the molding assembly 10 of FIG. 1. The output module 30 is also a common framework for use with both transfer and compression molding of electronic devices on leadframe strips. A leadframe off-loader 32 receives the leadframe after the electronic devices mounted thereon have been molded and places the leadframe onto the output module 30 such as a degate station 34. At the degate station 34, cull formed during molding are separated from the molded packages. A cull bin 36 receives the cull for disposal. An output transfer arm 38 picks up the leadframe and places the leadframe in a magazine in a stack magazine station 40 for transfer to a downstream process.

Figure 4:
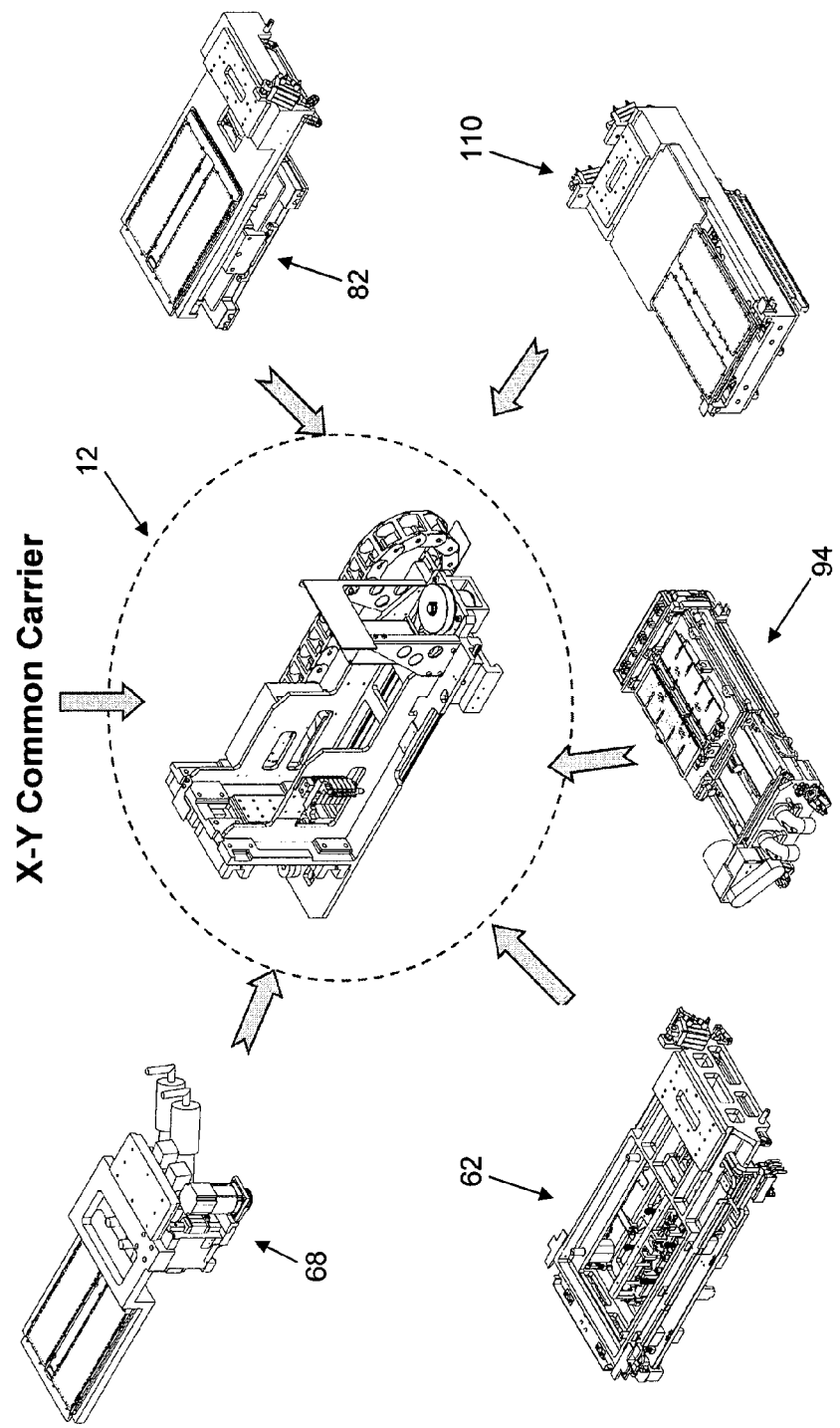
FIG. 4 is an isometric view of an exemplary common carrier which can be used as a mount for multiple types of attachments that are usable with the molding assembly.

FIG. 4 is an isometric view of an exemplary common carrier 12 which can be used as a mount for multiple types of attachments that are usable with the molding assembly 10. More than one common carrier 12 is preferably used at the same time to increase productivity. The common carrier 12 provides a common platform for convenient changing of different types of attachments that are utilized with the molding assembly 10, such as the leadframe and pellet onloader 62, liquid dispensing onloader 68, powder dispensing onloader 82, transfer molding off-loader 94 or compression molding on/off-loader 110. Hence, the molding assembly 10 may be converted for use between compression and transfer molding quickly and easily without having to change the whole molding assembly 10. The molding assembly 10 with the common carrier 12 also allows different dispensing methods required for the molding process to be utilized simply by changing the attachments held on the common carrier 12.

Figure 5:
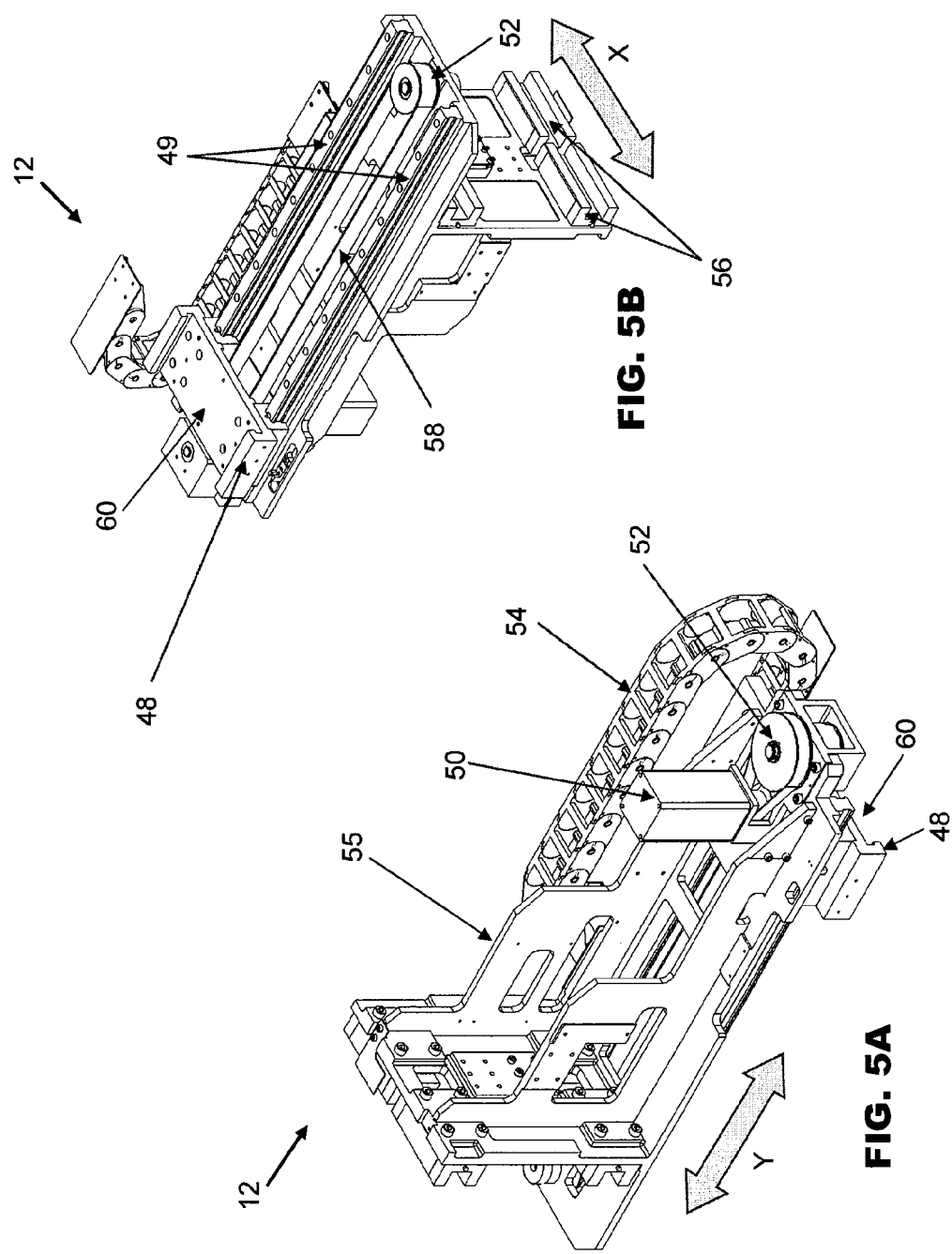
FIGS. 5A and 5B are isometric top and bottom views respectively of the common carrier of FIG. 4.

FIGS. 5A and 5B are isometric top and bottom views respectively of the common carrier 12 of FIG. 4. In FIG. 5A, an adaptor in the form of a mounting plate 60 includes a sliding guide 48 and is located at the base of the common carrier 12. An attachment having a corresponding mounting device is detachably and slidably mountable to the sliding guide 48 of the mounting plate 60. The mounting plate 60 is driven in a first direction or along a Y axis by a first motor, such as a driving servo motor 50, via a gear ratio driving pulley 52. A flexible energy chain 54 resides along one length of the common carrier 12 for housing cables and air tubings used in association with the attachment, and a carrier frame 55 supports the various components of the common carrier 12.

FIG. 5B illustrates an X-axis linear motion guide 56 located orthogonal to the Y-axis linear motion guide 49. The Y-axis linear motion guide 49 guides the mounting plate 60 in the Y direction. The X-axis linear motion guide 56 guides the common carrier 12 when it is driven by a second motor such as a servo motor in a second direction along the X-axis. A driving timing belt 58 is wound round the driving pulley 52 for driving the mounting plate 60 together with its attachment along the Y-axis. The mounting plate 60 is positioned next to the Y-axis linear motion guide 49 which serves as a common mount for attachments to be used with the molding assembly 10. In this way, attachments may be conveniently changed for different molding configurations.

Figure 6:
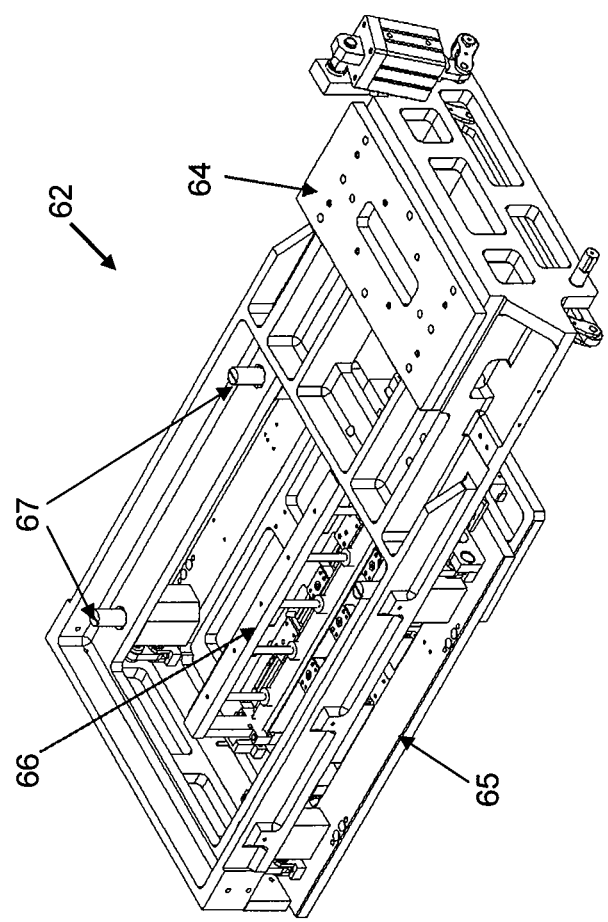
FIG. 6 is an isometric view of a leadframe and pellet onloader for use with a transfer molding process for loading leadframes and molding pellets.

FIG. 6 is an isometric view of a leadframe and pellet onloader 62 for use with the transfer molding process for loading leadframes and molding pellets. The leadframe and pellet onloader 62 has a mounting plate 64 which corresponds to and mates with the mounting plate 60 of the common carrier 12 when the leadframe and pellet onloader 62 is mounted to the mounting plate 60. A pellet pusher 66 loads pellets to a mold supply pot so that a plunger located in the mold supply pot may crush the solid pellet under elevated heat, causing liquefied molding compound to flow out of and be discharged from the mold supply pot located above the plunger through runners into the molding cavities of the presses 43.

A product-related part mounting plate 65 is used for mounting a handling tool which is specific to a product being molded. The product-related part mounting plate 65 is vertically movable and is guided by z-motion guide rods 67.

Figure 7:
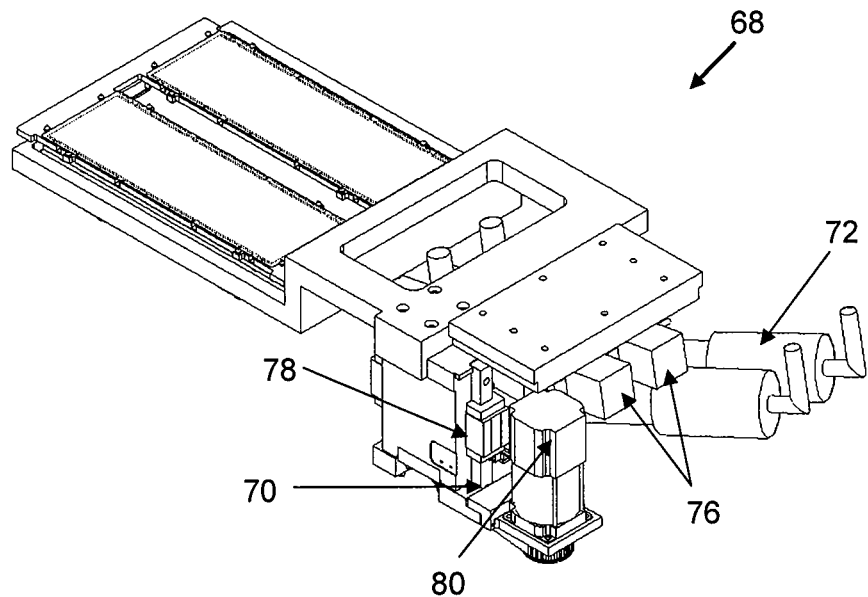
FIG. 7 is an isometric view of a liquid dispensing onloader for use with a strip compression molding process for dispensing liquid.

FIG. 7 is an isometric view of a liquid dispenser 68 for use with the strip compression molding process for dispensing liquid. A Z-motion driving pulley 70 is located at a base of the liquid dispenser 68 for driving the liquid dispenser 68 vertically, and is guided by a Z motion guide 78 driven by a servo-motor 80. The liquid dispensing onloader 68 dispenses molding liquid contained in liquid cartridges 72, and the molding liquid is ejected with force generated from liquid dispenser driving motors 76. A mounting plate (not shown) for mounting the liquid dispenser 68 is located above the liquid dispenser 68.

Figure 8:
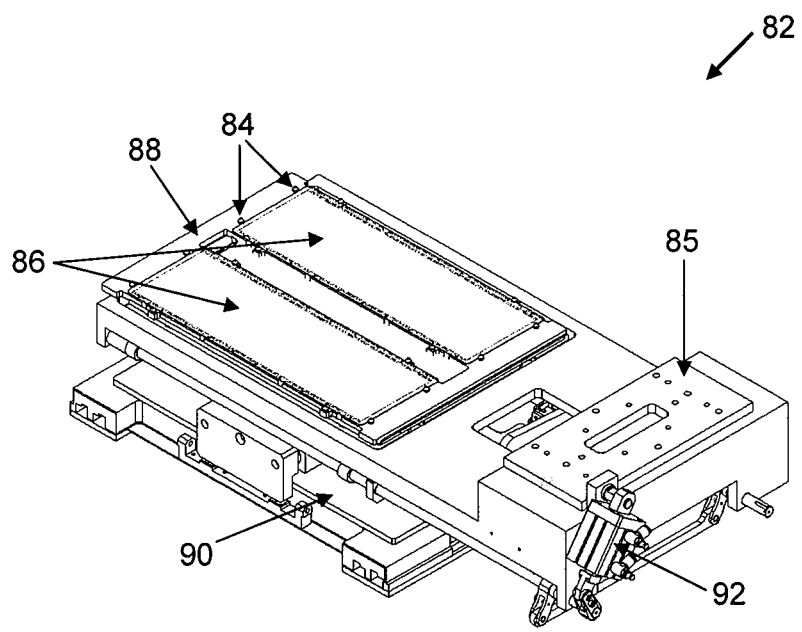
FIG. 8 is an isometric view of a powder dispensing onloader for use with a strip compression molding process for loading powder.

FIG. 8 is an isometric view of a powder dispenser 82 for use with the strip compression molding process for loading molding resin in powder form. Guide pins 84 located along the peripheries of leadframe handling sections 86 of a leadframe support plate 88 serve as guides to locate the leadframes during leadframe transfer, when the leadframes are placed onto the leadframe holding sections 86. A mounting plate 85 is used for mounting the powder dispenser 82 to the common carrier's mounting plate 60. A powder loading module 90 is operative to store molding powder and to dispense the powder into a molding cavity. A leadframe support plate driving cylinder 92 drives the leadframe support plate 88 to move in vertical directions.

FIGS. 9A and 9B are isometric top and bottom views respectively of a transfer molding off-loader 94 for use with the transfer molding process for off-loading leadframes and for cleaning a mold. In FIG. 9A, a mounting plate 96 provides a platform for mounting the transfer molding off-loader 94 to the common carrier 12. A cull handler 98 helps to remove cull from the molded electronic device packages. A cleaning module 100 is located at one end of the transfer molding off-loader 94 for cleaning the mold. FIG. 9B shows a leadframe holder having a plurality of inner fingers 102 and a corresponding set of outer fingers 104 for gripping molded leadframes in position in leadframe holding sections 106. Leadframes molded by transfer molding at the press station 42 can be moved by a product-related part 108 for leadframe pick-and-place to the transfer molding off-loader 94 and thereafter will be off-loaded from the molding assembly 10.

Figure 10A:
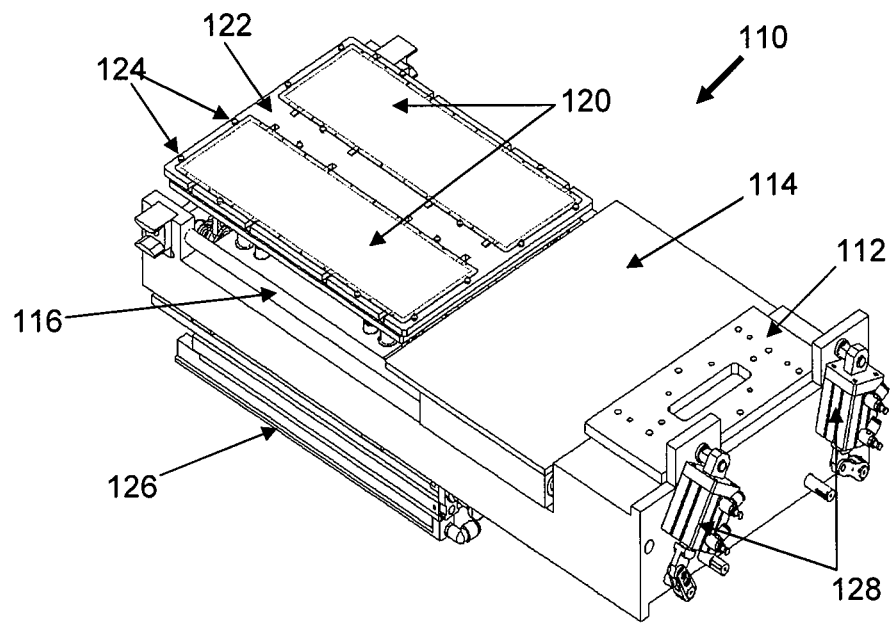
FIGS. 10A and 10B are isometric top and bottom views respectively of a compression molding on/off-loader for use with a strip compression molding process for respectively loading unmolded leadframes and off-loading molded leadframes to and from a mold chase.
Figure 10B:
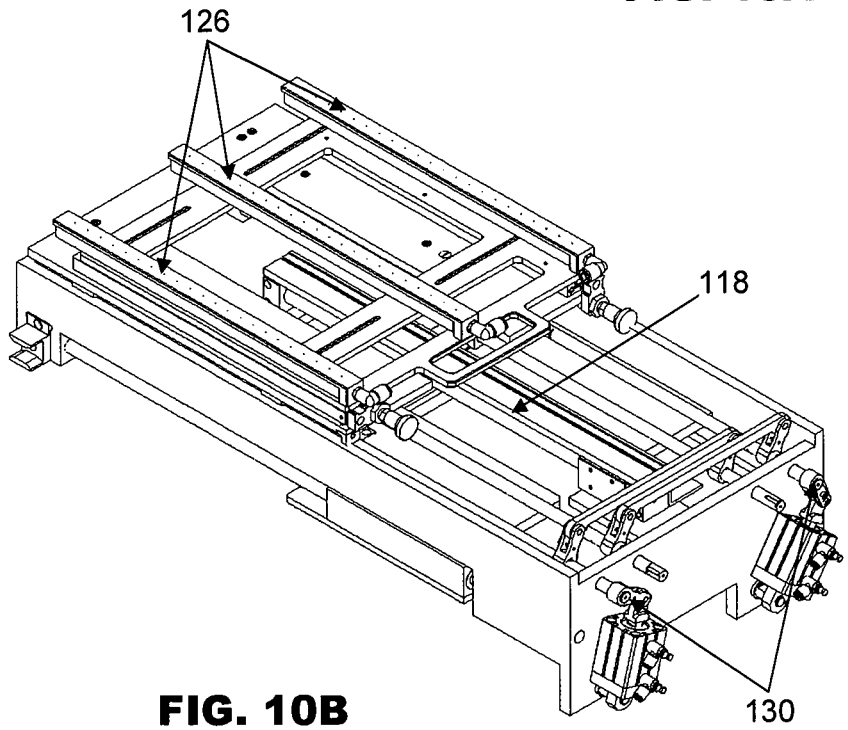

FIGS. 10A and 10B are isometric top and bottom views respectively of a compression molding on/off-loader 110 for use with a strip compression molding process for respectively loading unmolded leadframes to a press 43 and off-loading molded leadframes from the press 43. The compression molding off-loader 110 is detachably mountable onto the common carrier 12 via its mounting plate 112. FIG. 10A shows a leadframe press plate 114 for pressing onto and flattening leadframes 102 which are located in a mold. A guide rod 116 is located along a length of the compression molding off-loader 110 for moving the press plate 114 along the length thereof. This movement is controlled by a driving cylinder 118 shown in FIG. 10B. Molded or unmolded leadframes can be placed onto leadframe holding sections 120 on a leadframe loading plate 122, where the leadframes can be located and oriented by leadframe guide pins 124 during conveyance of the same.

A bottom pick-up module 126 may also comprise multiple suction bars to hold onto leadframes by vacuum suction. Driving cylinders 128 together with driving rods 130 drive the compression molding on/off-loader 110 for vertical motion. The compression molding off-loader 110 may be employed to work with either the liquid dispenser 68 which dispenses liquid or with the powder dispenser 82 which loads powder during the strip compression molding process.

It should be appreciated that the modular molding assembly 10 as described in the preferred embodiment of the invention does not require major modifications to convert a transfer molding system to a compression molding system and vice versa. Conversely, such conversion is facilitated by incorporating the common carrier 12 which is a common mount for multiple attachments that are suitable for use with either the transfer molding system or the compression molding system. The attachments may be swiftly and conveniently interchangeable for effectively replacing one module with another. In this way, it is not necessary for one to work with two separate molding systems for transfer molding and compression molding respectively. Thus, there are substantial savings in cost.

The invention described herein is susceptible to variations, modifications and/or additions other than those specifically described and it is to be understood that the invention includes all such variations, modifications and/or additions which fall within the spirit and scope of the above description.

The invention claimed is:

1. Modular molding assembly comprising:
   an input module for loading electronic devices for molding;
   a press station including one or more molding presses for molding the electronic devices;
   an output module for offloading molded electronic devices after they have been molded; and
   a carrier that is movable at least between the input module and the press station and/or the press station and the output module, the carrier having an adaptor located thereon for detachably mounting a first attachment or a second attachment which is operative to perform a function of transporting the electronic devices and/or introducing a molding compound to the press station for conducting molding;
   wherein the first and second attachments each has a corresponding mounting device for detachably mounting the first or second attachment onto the adapter and the first attachment has a different function from the second attachment.

2. Modular molding assembly as claimed in claim 1, further comprising a first linear motion guide along which the carrier is movable for guiding the carrier along a first direction, and a second linear motion guide along which the adaptor is movable for guiding the adaptor in a second direction which is perpendicular to the first direction.

3. Modular molding assembly as claimed in claim 2, further comprising a first motor for driving the carrier in the first direction, and a second motor for driving the adaptor in the second direction.

4. Modular molding assembly as claimed in claim 3, wherein the first and second motors are servo motors.

5. Modular molding assembly as claimed in claim 1, wherein the adaptor on the carrier comprises a mounting plate having a sliding guide to which the first or the second attachment is slidably mountable.

6. Modular molding assembly as claimed in claim 1, wherein the first or second attachment comprises an onloader for transfer molding comprising a substrate and molding compound onloader operative to transport substrates and supply molding compound to the press station.

7. Modular molding assembly as claimed in claim 1, wherein the first or second attachment comprises a liquid dispensing onloader operative to supply molding liquid to the one or more molding presses for compression molding.

8. Modular molding assembly as claimed in claim 1, wherein the first or second attachment comprises a powder dispensing onloader operative to supply molding resin in powder form to the one or more molding presses for compression molding.

9. Modular molding assembly as claimed in claim 1, wherein the first or second attachment comprises a molding offloader operative to offload molded substrates and to clean the one or more molding presses.

10. Modular molding assembly as claimed in claim 1, wherein the first or second attachment comprises a substrate loader operative to load unmolded substrates to the press station for compression molding and unload molded substrates from the press station.

11. Modular molding assembly as claimed in claim 1, wherein the input module is configured for selectively mounting a feeder bowl and a pellet handler module operative to provide pellets of molding compound to the input module for transfer molding.

12. Modular molding assembly as claimed in claim 11, wherein the input module is also configured for selectively mounting a powder dispensing module operative to provide molding compound to the input module for compression molding.

13. Modular molding assembly as claimed in claim 1, wherein the output module includes a degate station for separating cull formed during molding from electronic devices which have been molded.

14. Modular molding assembly as claimed in claim 1, further comprising an additional carrier which is movable at least between the input module and the press station and/or the press station and the output module and has an adaptor located on the additional carrier for detachably mounting the first or second attachment.

15. Modular molding assembly as claimed in claim 1, wherein the mounting device of first or second attachment further comprises a mounting plate for mating with the carrier's adaptor during mounting of the first or second attachment to the carrier.

16. Modular molding assembly as claimed in claim 1, wherein the input and output modules are located at opposite ends of a molding assembly line, and the press station is located between the input and output modules along the molding assembly line.

17. Modular molding assembly as claimed in claim 1, wherein the first attachment is configured for use in facilitating a transfer molding process and the second attachment is configured for use in facilitating a compression molding process.

18. A carrier for a modular molding assembly, the modular molding assembly comprising:
   an input module for loading electronic devices for molding;
   a press station including one or more molding presses for molding the electronic devices; and
   an output module for offloading molded electronic devices after they have been molded;
   wherein the carrier is movable at least between the input module and the press station and/or the press station and the output module and has an adaptor located on the carrier for detachably mounting a first attachment or a second attachment which is operative to perform a function of transporting the electronic devices and/or introducing a molding compound to the press station for conducting molding;
   wherein the first and second attachments each has a corresponding mounting device for detachably mounting the first or second attachment onto the adapter and the first attachment has a different function from the second attachment.

* * * * *

UNITED STATES PATENT AND TRADEMARK OFFICE
CERTIFICATE OF CORRECTION

| | |
|---|---|
| PATENT NO. | : 8,419,404 B2 |
| APPLICATION NO. | : 12/701036 |
| DATED | : April 16, 2013 |
| INVENTOR(S) | : Shu Chuen Ho et al. |

It is certified that error appears in the above-identified patent and that said Letters Patent is hereby corrected as shown below:

On the title page item (75) should read:

Item (75) Inventors: Shu Chuen Ho, Singapore (SG);
Jian Wu, Singapore (SG);
Choon Hong Cheong, Singapore (SG);
Chee Toh Teh, Singapore (SG);
Fu Sun Huang, Singapore, (SG)

Signed and Sealed this
Eleventh Day of June, 2013

Teresa Stanek Rea
*Acting Director of the United States Patent and Trademark Office*